(12) United States Patent
Shope (10) Patent No.: US 8,894,126 B2
(45) Date of Patent: Nov. 25, 2014

(54) WINDSHIELD ASSEMBLY FOR MOTOR VEHICLE

(71) Applicant: John Shope, Phoenix, AZ (US)

(72) Inventor: John Shope, Phoenix, AZ (US)

( * ) Notice: Subject to any disclaimer, the term of this patent is extended or adjusted under 35 U.S.C. 154(b) by 0 days.

(21) Appl. No.: 13/714,471

(22) Filed: Dec. 14, 2012

(65) Prior Publication Data

US 2014/0167441 A1    Jun. 19, 2014

(51) Int. Cl.
*B60J 1/00*    (2006.01)
*B62J 17/04*    (2006.01)

(52) U.S. Cl.
CPC . *B60J 1/006* (2013.01); *B62J 17/04* (2013.01)
USPC .......................... 296/84.1; 296/78.1; 296/77.1

(58) Field of Classification Search
CPC ....................................................... B60J 1/006
USPC ................................................. 296/78.1, 84.1
See application file for complete search history.

(56) References Cited

U.S. PATENT DOCUMENTS

| 4,089,556 | A | 5/1978 | Stobar |
| 4,168,098 | A | 9/1979 | Willey |
| 4,692,969 | A | 9/1987 | Johnson |
| 5,845,955 | A | 12/1998 | Willey |
| 6,176,538 | B1 | 1/2001 | Lawson et al. |
| 6,505,877 | B1 | 1/2003 | Devlin et al. |
| 7,032,915 | B2 | 4/2006 | Bedard et al. |
| 7,380,860 | B2 | 6/2008 | Dolan |
| 2007/0296237 | A1* | 12/2007 | Anderson ................ 296/78.1 |
| 2009/0134655 | A1* | 5/2009 | Paluszkiewicz ........ 296/78.1 |

* cited by examiner

*Primary Examiner* — Glenn Dayoan
*Assistant Examiner* — Melissa A Black
(74) *Attorney, Agent, or Firm* — Ice Miller LLP (57) ABSTRACT

According to one aspect of the present disclosure, a windshield assembly for a motor vehicle is disclosed. The windshield assembly includes a plate and a shield, where the shield is attached to the plate by one or more fasteners such that the shield and plate define a channel. The channel is configured to accept an attachment portion of a vehicle, and the plate is capable of being attached to the vehicle using one or more fasteners that engage the attachment portion and the plate, whereby no portion of the one or more fasteners is visible from the front side of the windshield assembly when the attachment portion is disposed within the channel.

20 Claims, 8 Drawing Sheets

WINDSHIELD ASSEMBLY FOR MOTOR VEHICLE

BACKGROUND

Many motor vehicles are equipped with a windshield that provides protection from wind and debris to which an operator is typically exposed when the vehicle is in motion. Such windshields are generally clear or transparent structures mounted on the upper and rearward section of a hood, fairing, or other forward portion of the vehicle. For larger, multi-passenger vehicles such as automobiles, the windshield is an integral part of a cabin that surrounds the passengers and is, accordingly, mounted into a supporting frame that positions and retains the windshield on all sides. For smaller vehicles, the windshield may be mounted and retained along less than the entire perimeter of the windshield and may extend only partially in front of the operator. Examples of vehicles with such windshields include motorcycles, snowmobiles, all-terrain vehicles, power boats, golf carts, and similar vehicles.

Figure 8:
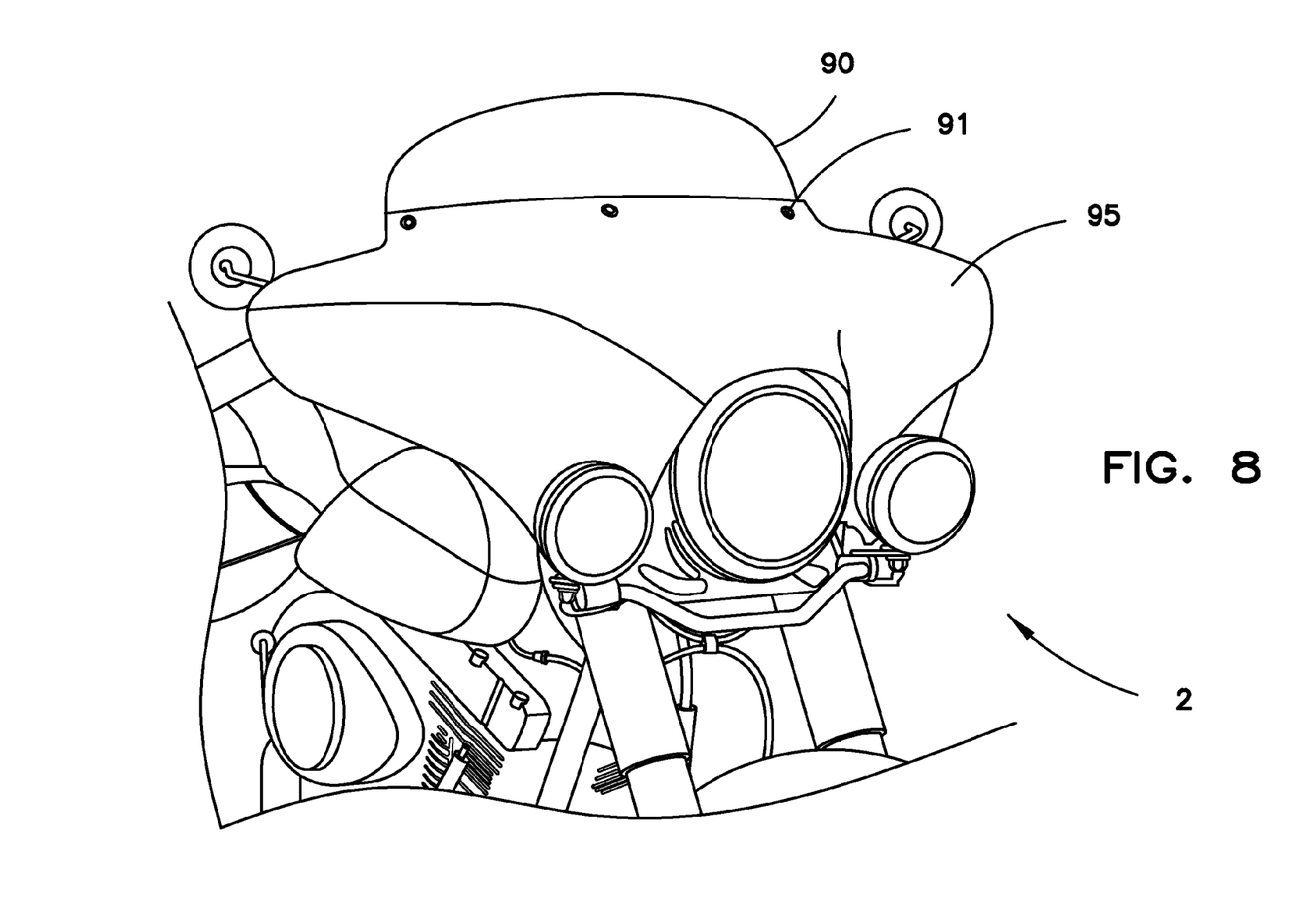
FIG. 8 a windshield for a motor vehicle in the prior art where the fasteners are visible from the front of the vehicle.

Conventionally, certain motor vehicles retain the windshield by positioning it between two surfaces of the hood or fairing and securing it in place with a variety of different fasteners that are inserted through the windshield and hood or fairing. In many cases, this conventional retention scheme results in an arrangement where the fasteners are visible and prominent from the front of the vehicle after the windshield is installed, creating an exterior appearance that some viewers find unsightly, unappealing, and undesirable. For example, shown in FIG. 8 is a windshield for a motor vehicle using a conventional retention scheme that exists in the prior art. In the arrangement shown in FIG. 8, the windshield 90 is mounted to fairing 95 of vehicle 2. Windshield 90 is retained between front and rear portions of fairing 95 by a set of fasteners 91 that are clearly visible from the front of the vehicle 2.

Attempts to lessen the visual impact of conventional retention schemes have generally been limited to installing trim pieces or molding strips along the windshield's mounting points. Many of these trim pieces, however, did not conceal the fasteners and, in some cases, made their presence even more pronounced.

Accordingly, there is a need for a windshield assembly for motor vehicles that can be securely retained to a hood or fairing without the negative appearance of fasteners that are exposed and visible from the front of the vehicle.

BRIEF SUMMARY

According to one aspect of the present invention, a windshield assembly for a motor vehicle is disclosed. The windshield assembly includes a plate and a shield, having a front side and an opposing rear side, where the plate is attached to the rear side of the shield by one or more fasteners such that the shield and plate define a windshield assembly channel. The windshield assembly channel is configured to accept an attachment portion of a vehicle, and the plate is capable of being attached to the vehicle using one or more fasteners that engage the attachment portion and the plate, such that no portion of any fastener is visible from the front side of the shield when the attachment portion is disposed within the windshield assembly channel.

In at least one embodiment of the present invention, a windshield for a motor vehicle further includes one or more one or more fairing fasteners, the one or more fairing fasteners capable of attaching the plate to the attachment portion of the vehicle through one or more openings formed through the plate. In at least one embodiment of the present invention, a windshield for a motor vehicle further includes one or more plate fasteners, the one or more plate fasteners capable of attaching the plate to the shield by engaging one or more fastener recesses formed in the rear side of the shield via one or more fastener holes formed through the plate, such that no portion of any fastener is visible from the front side of the shield.

In at least one embodiment of the present invention, a windshield for a motor vehicle further includes at least one fastener recess formed to accept a shield nut disposed within the at least one fastener recess, where the shield nut is insert molded or staked in the at least one fastener recess. In at least one embodiment of the present invention, each of the one or more plate fasteners is self-tapping and the one or more fastener recesses are formed to accept the one or more self-tapping plate fasteners.

In at least one embodiment of the present invention, a windshield for a motor vehicle includes a shield formed from a polymeric material. In at least one embodiment of the present invention, the shield is formed from an opaque material. In at least one embodiment of the present invention, the shield and the plate are formed in an integral configuration that defines the windshield assembly channel.

According to one aspect of the present invention, a motor vehicle is disclosed. In at least one embodiment of the present invention, a motor vehicle includes a windshield assembly for a motor vehicle, which includes a plate and a shield. The shield, having a front side and an opposing rear side, is attached at the rear side of the shield to the plate, such that the shield and the plate define a windshield assembly channel. The windshield assembly channel is configured to accept an attachment portion of a vehicle, such that the plate is capable of being attached to the vehicle using one or more fasteners that engage two or more of the shield, attachment portion, and plate when the attachment portion is disposed within the windshield assembly channel, such that no portion of any fastener is visible on the front side of the shield.

In at least one embodiment of the present invention, a motor vehicle further includes a shield further having a shield recess formed in the rear side of the shield and one or more of fastener recesses formed therein to accept one or more fasteners attaching the shield to the plate. In at least one embodiment of the present invention, the one or more fasteners attaching the shield to the plate is a self-tapping fastener that engages the one or more fastener recesses. In at least one embodiment of the present invention, the one or more fasteners that engage two or more of the shield, attachment portion, and plate includes a screw that engages a nut embedded in the attachment portion. In at least one embodiment of the present invention, the plate further includes one or more plate openings formed therethrough, where one or more fasteners pass through the one or more plate openings and secure the plate between two attachment portions of the vehicle.

In at least one embodiment of the present invention, a motor vehicle further includes a shield formed from a polymeric material. In at least one embodiment of the present invention, the shield is formed from an opaque material. In at least one embodiment of the present invention, the motor vehicle is a motorcycle.

According to one aspect of the present invention, a method of attaching a windshield assembly to a motor vehicle is disclosed. In at least one embodiment of the present invention, a method of attaching a windshield assembly to a motor vehicle includes a step of introducing a plate between a first attachment portion of a vehicle and a second attachment portion of the vehicle. In at least one embodiment of the present invention, a method of attaching a windshield assembly to a motor vehicle includes a step of inserting one or more fasteners through the first attachment portion of the vehicle and into the second attachment portion of the vehicle, such that the one or more fasteners engages the second attachment portion of the vehicle and secures the plate between the first attachment portion of the vehicle and the second attachment portion of the vehicle. In at least one embodiment of the present invention, a method of attaching a windshield assembly to a motor vehicle includes a step of attaching a shield having a front side and an opposing rear side to the plate via one or more fasteners such that no portion of the one or more fasteners is visible from the front side of the shield. In at least one embodiment of the present invention, a method of attaching a windshield assembly to a motor vehicle includes one or more fasteners securing the plate between the first attachment portion and the second attachment portion, which include a screw that engages a nut embedded in the second attachment portion.

DETAILED DESCRIPTION

The present application discloses various embodiments of a windshield assembly for a motor vehicle and methods of attaching a windshield assembly to a motor vehicle. For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 1:
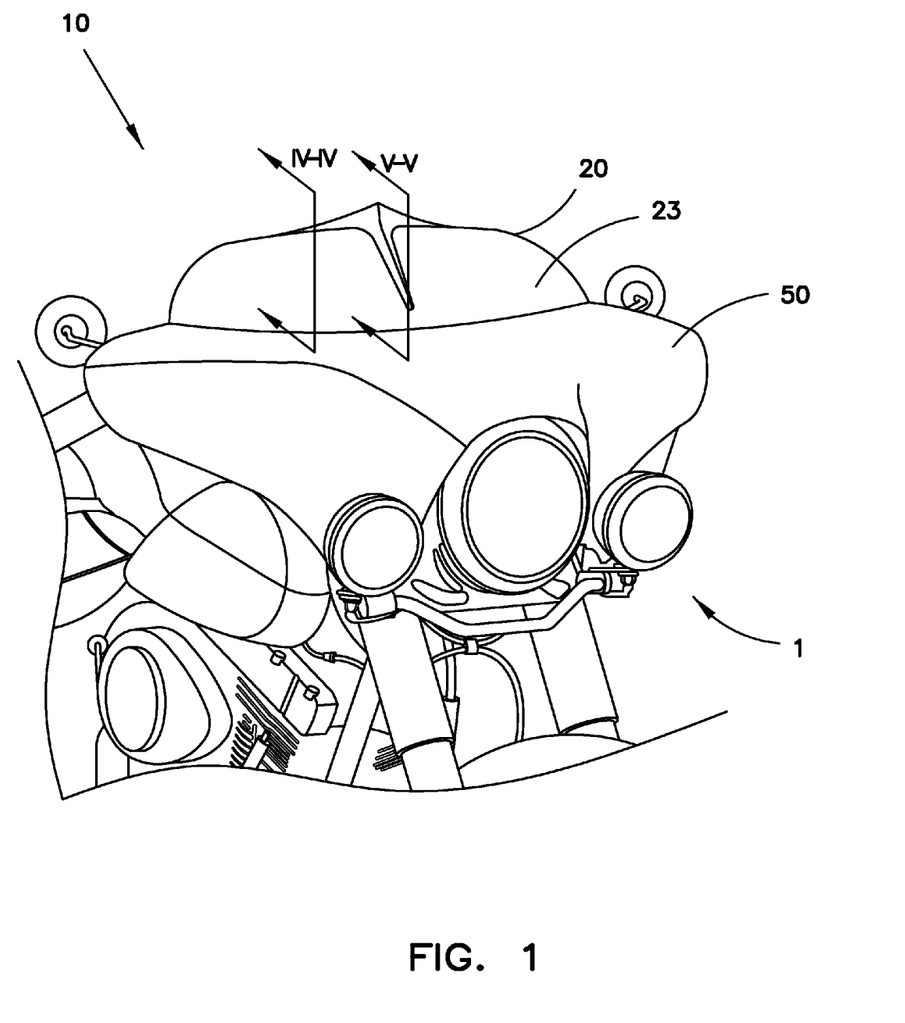
FIG. 1 shows an isometric view of an embodiment of an exemplary windshield assembly for a motor vehicle according to the present disclosure.
Figure 2:
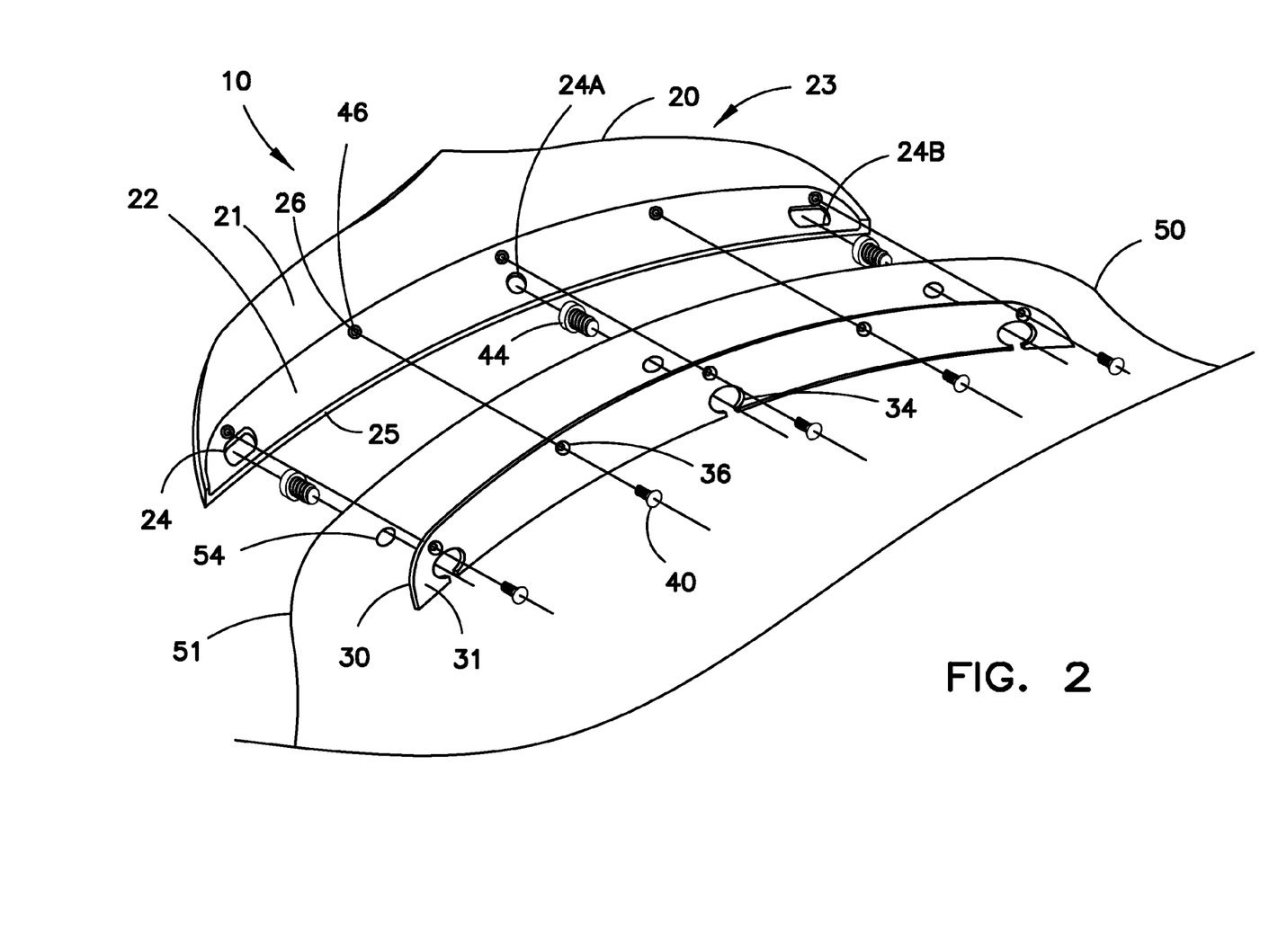
FIG. 2 shows an exploded isometric view of an embodiment of a windshield assembly for a motor vehicle according to the present disclosure.
Figure 3:
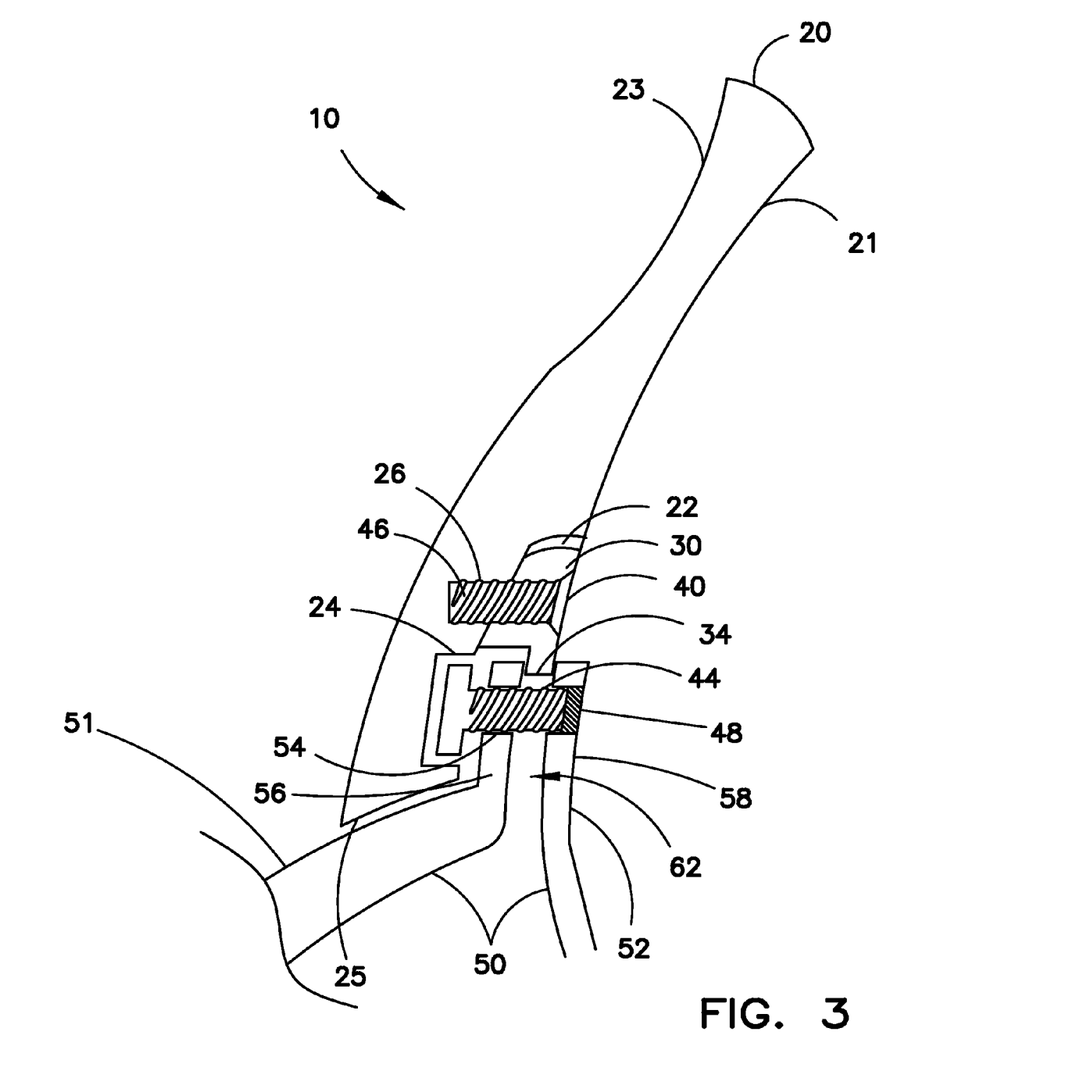
FIG. 3 shows a cross-sectional view of an exemplary windshield assembly for a motor vehicle according to the present disclosure, taken at line V-V of FIG. 1.

FIG. 1 shows an isometric view of an embodiment of an exemplary windshield assembly for a motor vehicle according to the present disclosure as mounted to a vehicle. As shown in FIG. 1, a windshield assembly 10 may be mounted to a fairing 50 of a vehicle 1 such that no fasteners or other mounting hardware are visible when the windshield assembly 10 is viewed from the front side of the vehicle 1. As shown in FIGS. 2 and 3, the windshield assembly 10 includes a shield 20 having a rear surface 21, an opposing front surface 23, and a bottom edge 25. The windshield assembly 10 may further include a plate 30 and a plurality of plate fasteners 40, which secure the plate 30 to the shield 20 in assembly. The shield 20 and the plate 30 may be formed such that the windshield assembly 10 may be mounted to the fairing 50 with the plate 30 disposed between a front fairing portion 51 and a rear fairing portion 52 of the fairing 50. (For clarity, the rear fairing portion 52 is not shown in FIG. 2.) The plate 30 may be secured by one or more fairing fasteners 44, which pass through one or more fairing holes 54 formed through the front fairing portion 51 and engage the rear fairing portion 52 as described herein, thereby trapping the plate 30 between the front fairing portion 51 and rear fairing portion 52. The shield 20 may be mounted to the plate 30, thereby hiding the one or more fairing fasteners 44 from view from the front of the vehicle when fully assembled and installed.

Figure 4:
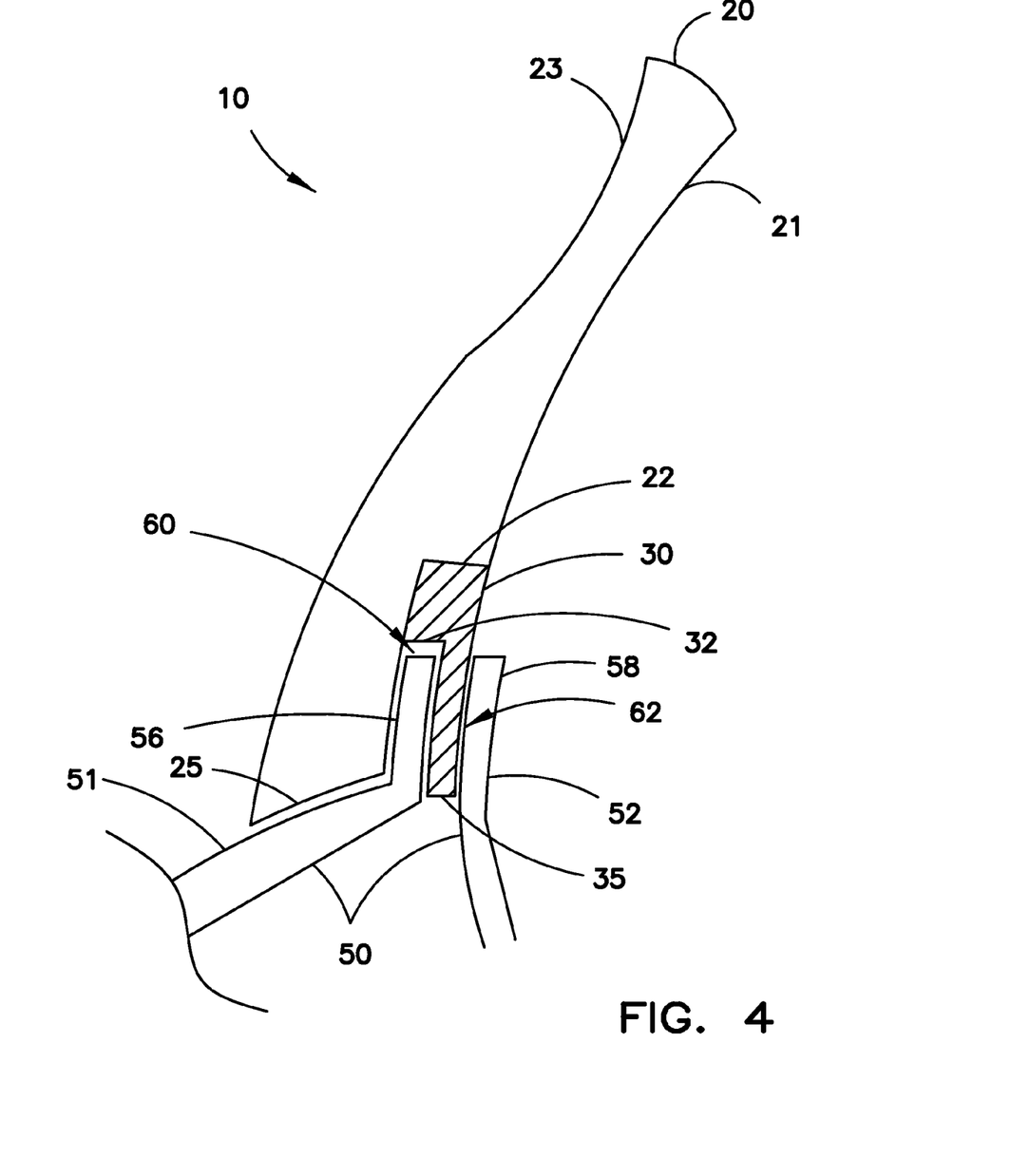
FIG. 4 shows a cross-sectional view of an exemplary windshield assembly for a motor vehicle according to the present disclosure, taken at line IV-IV of FIG. 1.

The shield 20 may further include a fairing recess 22 formed in the rear surface 21 extending towards the bottom edge 25 and front surface 23 of the shield 20. The fairing recess 22 may be formed to extend toward the front surface 23 of the shield 20 such that the rear side of plate 30 seats substantially flush with the rear surface 21 of the shield 20 even with the front fairing portion 51 disposed in the windshield assembly channel 60 in assembly as shown in FIG. 4. Within the fairing recess 22 may be formed at least one fastener pocket 24. Further, the at least one fastener pocket 24 may include a center fastener pocket 24A and one or more side fastener pockets 24B; however, the center fastener pocket 24A need not be positioned along the centerline of the shield 20. As shown in FIG. 4, the center fastener pocket 24A may be formed with adequate depth to accept the fairing fastener 44 and to enable net positioning of the shield 20 relative to the front fairing portion 51 via contact between the edges of the center fastener pocket 24A and the fairing fastener 44 on at least three geometric axes. Likewise, the one or more side fastener pockets 24B may be formed with adequate depth to accept a fairing fastener 44. In at least one embodiment, the one or more side fastener pockets 24B may be formed with a non-circular, slotted shape such that mounting the shield 20 to the fairing 50 may be easily adapted to variations in the location of the one or more fairing holes 54 and/or the sizes of the one or more fairing fasteners 44. Accordingly, the shield 20 is capable of adapting to and compensating for build variation in a given faring 50 or vehicle 1.

The shield 20 may further include a plurality of fastener recesses 26 formed within the fairing recess 22. Each of the plurality of fastener recesses 26 may be formed to accept a plate fastener 40. The plate fastener 40 may be a self-threading or self-clinching type of fastener or any suitable type of fastener that provides sufficient retention force to maintain firm contact between the plate 30 and the shield 20 in operation. Alternatively, in at least one embodiment of the present disclosure, each of the plurality of fastener recesses 26 may be formed to accept a shield nut 46, the shield nut 46 formed to accept a plate fastener 40. Each of the plurality of shield nuts 46 may be a threaded fastener formed to accept a corresponding threaded plate fastener 40. Further, each of the plurality of shield nuts 46 may be insert molded into the shield 20. Alternatively, each of the plurality of shield nuts 46 may be embedded into a fastener recess 26 of the shield 20 by heat, vibration, or sonic staking, or any suitable process that permanently fixes each shield nut 46 in the shield 20.

Figure 5:
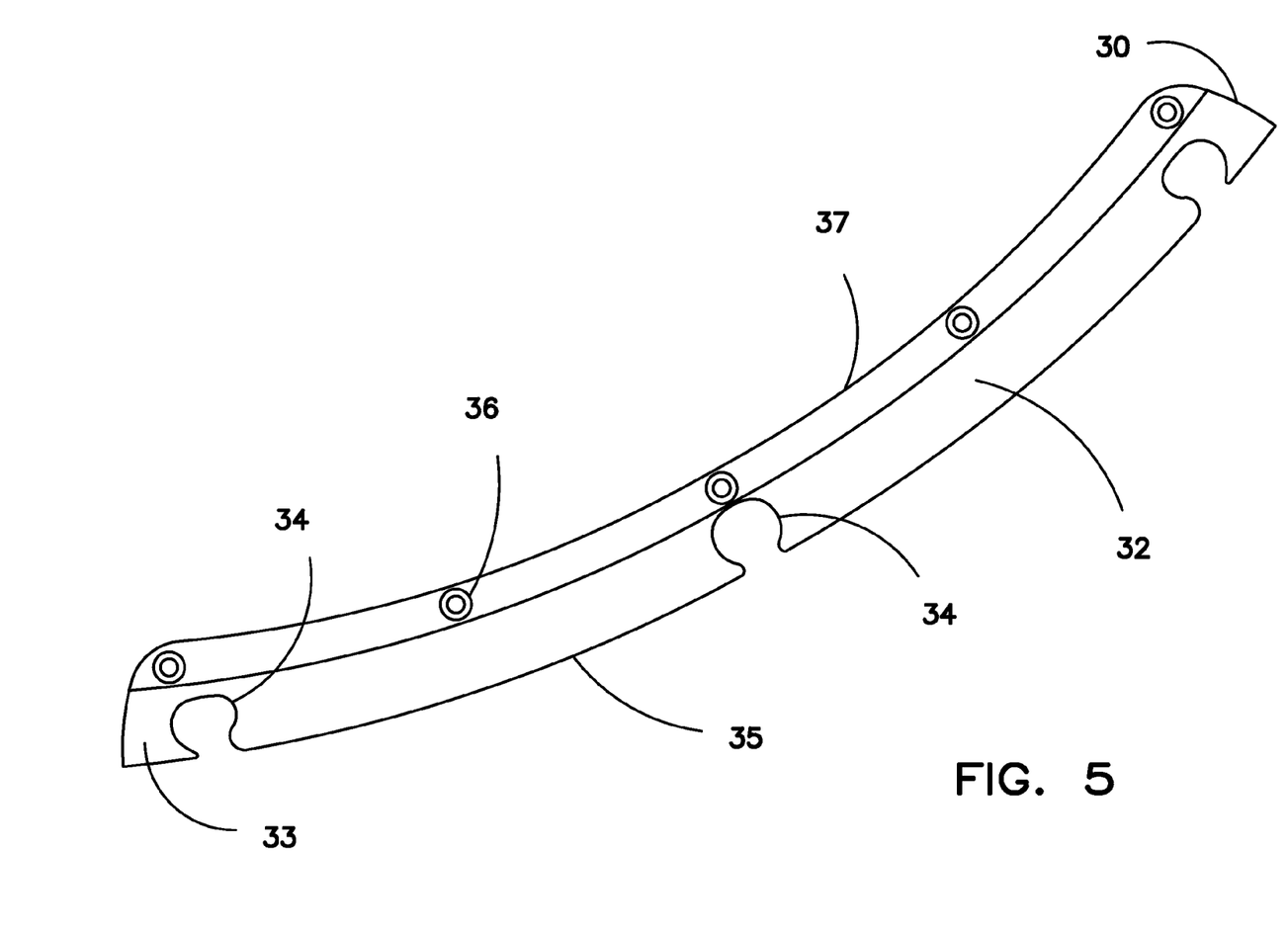
FIG. 5 shows an isometric view of an embodiment of a plate for a windshield assembly for a motor vehicle according to the present disclosure.

As shown in FIG. 5, the plate 30 includes a front side 33, a bottom edge 35, and an opposing top edge 37. The plate 30 also includes a rear side 31 opposite the front side 33 as shown in FIG. 2. The plate 30 may further include a plate recess 32 formed in the front side 33 towards the bottom edge 35 of plate 30. The plate 30 may further include a plurality of fastener holes 36 formed therethrough adjacent the top edge 37, outside the plate recess 32, and positioned to align with the plurality of fastener recesses 26 of the shield 20 in assembly. Each of the plurality of fastener holes 36 may be formed to accept a corresponding plate fastener 40. Further, each of the plurality of fastener holes 36 may be counter-sunk from the rear side 31 to enable the mating plate fastener 40 to seat flush or below the rear side 31 in assembly. Finally, within the plate recess 32 may be formed therethrough at least one plate opening 34, adjacent to or toward the bottom edge 35. The at least one plate opening 34 may be positioned to align with at least one fairing hole 54 when the plate 30 is mounted to the fairing 50 as shown in FIG. 3. Accordingly, the plate 30 enables an appealing aesthetic appearance of the windshield assembly 10, where neither the plate 30 nor fasteners or other mounting hardware are visible from the front of vehicle 1.

In assembly, as shown on FIG. 4, the plate recess 32 and the shield recess 22 define the windshield assembly channel 60, which may be formed to accept a portion of fairing 50, including, but not limited to, the front fairing portion 51. Further, as shown in FIG. 4, the plate recess 32 may be formed at a depth such that the front fairing portion 51 may substantially occupy the windshield assembly channel 60 defined by the fairing recess 22 and the plate recess 32 in assembly, thereby enabling secure mating of the windshield assembly 10 to the fairing 50.

FIGS. 3 and 4 show the windshield assembly 10 mounted to the fairing 50. FIG. 4 depicts a cross-section through the windshield assembly 10 taken off-center at line IV-IV of FIG. 1. As shown in FIG. 4, the shield 20 may be disposed forward of the front fairing 51 portion of the fairing 50. In at least one embodiment, the windshield assembly 10 may be capable of mounting to the fairing 50, which may include a first attachment wall 56 of the front fairing portion 51 and a second attachment wall 58 of the rear fairing portion 52. The first attachment wall 56 and a second attachment wall 58 may define a fairing channel 62. In such an embodiment, the plate 30 may interface with the fairing 50 such that the plate 30 is trapped between the first attachment wall 56 and the second attachment wall 58 within the fairing channel 62, whereby the plate 30 substantially occupies the fairing channel 62. Subsequently, the shield 20 may be attached to the plate 30 by any suitable fastening means. Accordingly, the windshield assembly 10 may be secured to the fairing 50 by trapping the plate 30 between the front fairing portion 51 and the rear fairing portion 52, unlike conventional mounting schemes in which a windshield 90 is trapped between portions of the fairing 95, as shown in FIG. 8 for example.

FIG. 3 depicts a cross-section through the vertical centerline of the windshield assembly 10 at line V-V of FIG. 1. As shown in FIG. 3, the windshield assembly 10 may be securely disposed between the first attachment wall 56 of the front fairing portion 51 and a second attachment wall 58 of the rear fairing portion 52 via at least one fairing fastener 44 that engages a mating fastener 48 embedded in the second attachment wall 58. Alternatively, the at least one fastener 44 may pass through the second attachment wall 58 and engage a mating fastener (not shown). In at least one embodiment, one end of the fastener 44 may be affixed to the surface of the at least one fastener pocket 24 by such processes as sonic, vibration, or spin welding, or any suitable process to securely affix the fastener 44. Accordingly, the opposite end of such a fairing fastener 44 may pass through the second attachment wall 58 and engage a mating fastener (not shown). In yet another embodiment, the fairing fastener 44 may include a boss formed integral to the shield 20 that may be engaged by a mating fastener 48.

Figure 6:
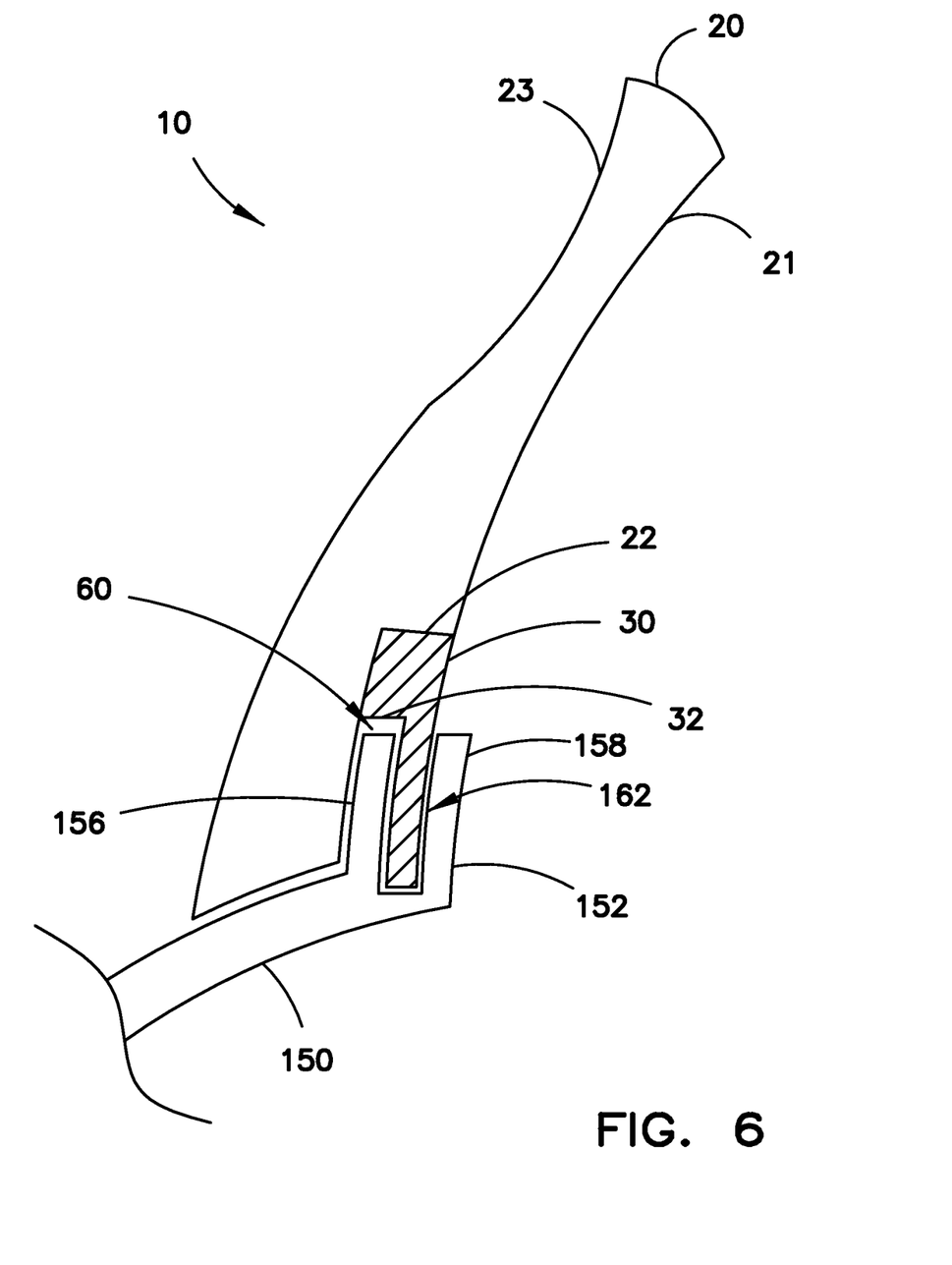
FIG. 6 shows a cross-sectional view of an exemplary windshield assembly for a motor vehicle according to the present disclosure mounted to an alternative fairing, taken at line IV-IV of FIG. 1.

In at least one embodiment according to the present disclosure, as shown in FIG. 6, the windshield assembly 10 may be mounted to a fairing 150, which includes an attachment portion 152 having a front wall 156 and a rear wall 158 defining a U-shaped channel 162. Similar to the attachment scheme described with respect to the fairing 50, the plate 30 may be mounted within the channel 162 and secured in place by one or more fairing fasteners 44 that pass through the front wall 156 and into the second wall 158 where the one or more fairing fasteners 44 engage one or more mating fasteners embedded in the second wall 158. Subsequently, the shield 20 may be attached to the plate 30 by any suitable fastening means, thereby attaching the windshield assembly 10 to the fairing 150. Consequently, the windshield assembly 10 is capable of mounting to fairings having various configurations.

In at least one embodiment according to the present disclosure, the plate 30 may be integral to shield 20 whereby a single part incorporates the features and functions described herein regarding the assembly of the plate 30 to the shield 20. In such an embodiment, certain fasteners such as the plurality of plate fasteners 40 and the plurality of shield nuts 46 may not be included in the windshield assembly 10.

The shield 20 and the plate 30 may be formed of such materials as safety glass, metal, or polymeric materials such as polycarbonate, polyurethane, acrylic, or other suitable materials. The material used for the shield 20 and plate 30 may be transparent, translucent, or opaque. In at least one embodiment according to the present disclosure, the shield 20 and plate 30 may include a painted surface finish to match or complement the appearance and color scheme of the fairing 50. The shield 20 and plate 30 may be formed by injection molding, compression molding, casting, machining, stereolithography, selective laser sintering, or any other suitable process. The various fasteners described herein may be made of conventional materials by conventional processes. For example, the plurality of shield nuts 46 may be formed of a metal, including without limitation steel, stainless steel, or brass; plastic; or other material functionally compatible with a material of the plurality of fasteners 40.

Figure 7:
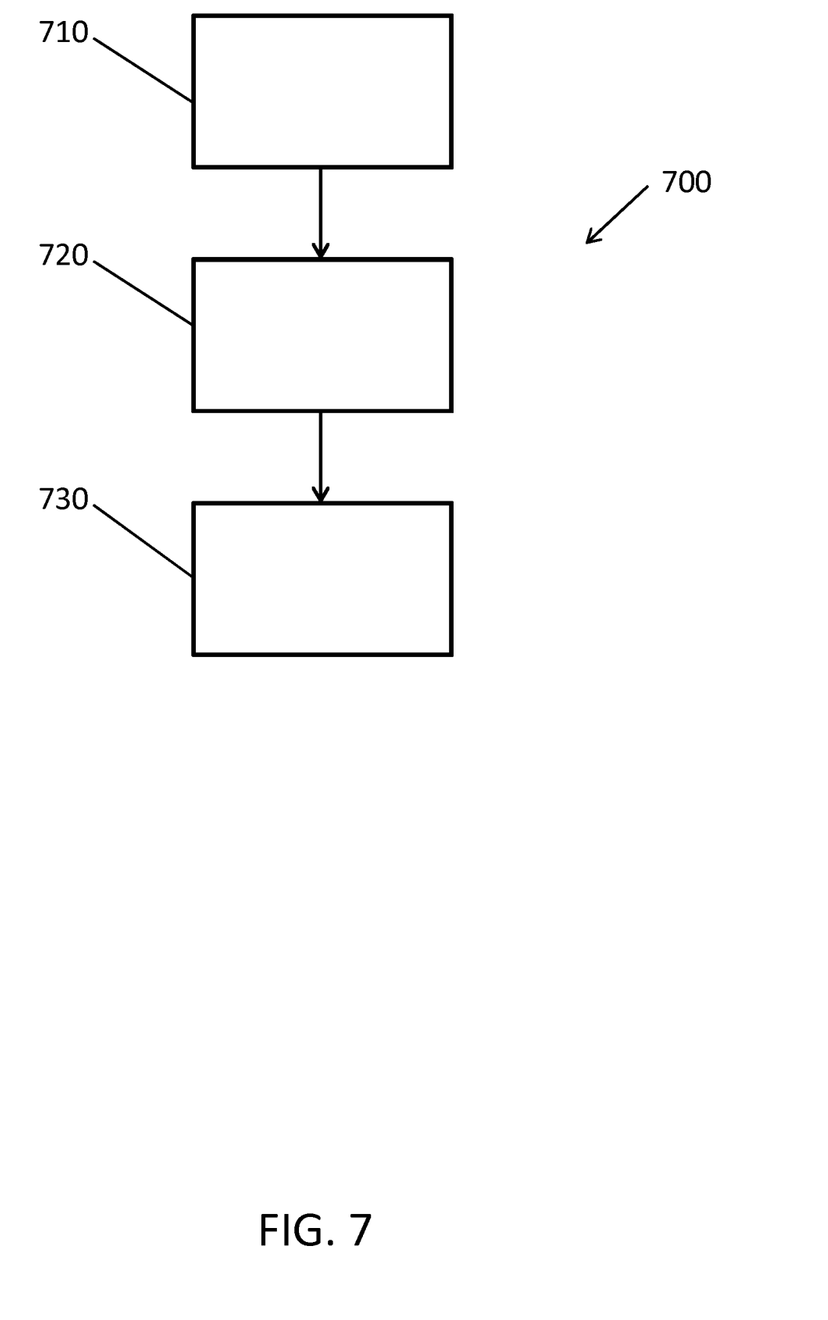
FIG. 7 shows a method of attaching a windshield assembly to a motor vehicle according to the present disclosure.

In at least one embodiment of the present disclosure as shown in FIG. 7, a method 700 of attaching a windshield assembly 10 to a motor vehicle 1 may include a step 710 of introducing a plate 30 between the front fairing portion 51 and the rear fairing portion 52. The method 700 may further include a step 720 of inserting one or more fairing fasteners 44 through the front fairing portion 51 and at least one plate opening 34 in the plate 30 to engage the rear fairing portion 52. In at least one embodiment, the one or more fairing fasteners 44 engage the mating fasteners 48 and secure the plate 30 between the front fairing portion 51 and the rear fairing portion 52 accordingly. The method 700 may further include a step 730 of attaching a shield 20 to the plate 30 via one or more of the plurality of plate fasteners 40, such that no portion of the one or more fairing fasteners 44 or other mounting hardware is visible from the front side of the windshield assembly 10.

While various embodiments of a windshield assembly for a motor vehicle have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure. Indeed, this disclosure is not intended to be exhaustive or to limit the scope of the disclosure.

For example, various means of fastening the plate 30 to the shield 20 and the windshield assembly 10 to the vehicle 1 are disclosed herein. While certain types of fasteners are disclosed and depicted in the Figures, such fastening means are not so limited by the disclosure and may include, but not be limited to, other fasteners such as screws, bolts, roll pins, rivets, hooks and loops (i.e., Velcro®), and snaps. Further, the term "fastener" as used in this disclosure may include methods of attachment that do not require a separate component. For instance, a fastener may include snap features or tongue and groove configurations formed in the mating parts, adhesives to bond the mating parts, and other suitable methods of fastening known in the art. Accordingly, one skilled in the art with the benefit of this disclosure will recognize that various fasteners are capable of meeting the disclosed requirements and that such means fall within the scope of this disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. A windshield assembly for a motor vehicle, the windshield assembly comprising:
   a plate; and
   a shield, having a front side and an opposing rear side, wherein the plate is attached to the rear side of the shield by one or more first fastening members whereby the shield and the plate define a windshield channel between the shield and the plate, the windshield channel configured to accept an attachment portion of a vehicle,
   wherein further the plate is capable of being attached to the vehicle using one or more second fastening members that engage two or more of the shield, attachment portion, and plate when the attachment portion of the vehicle is disposed within the windshield channel, whereby no portion of the one or more first fastening members or the one or more second fastening members extends to the front side of the shield.

2. The windshield assembly of claim 1, the windshield assembly further comprising:
   one or more fairing fasteners, the one or more fairing fasteners capable of attaching the plate to the attachment portion of the vehicle through at least one of one or more plate openings.

3. The windshield assembly of claim 1, the windshield assembly further comprising:
   one or more plate fasteners, the one or more plate fasteners capable of attaching the plate to the shield by engaging one or more fastener recesses formed in the rear side of the shield via one or more fastener holes formed through the plate.

4. The windshield assembly of claim 3, wherein the one or more fastener recesses further comprise:
   at least one fastener recess formed to accept a shield nut disposed within the at least one fastener recess.

5. The windshield assembly of claim 4, wherein the shield nut is insert molded or staked in the at least one fastener recess.

6. The windshield assembly of claim 3, wherein each of the one or more plate fasteners is self-tapping and the one or more fastener recesses are formed to accept the one or more self-tapping plate fasteners.

7. The windshield assembly of claim 1, wherein the shield is formed from a polymeric material.

8. The windshield assembly of claim 1, wherein the shield is formed from an opaque material.

9. The windshield assembly of claim 1, wherein the shield and the plate are formed in an integral configuration that defines the windshield assembly channel.

10. A motor vehicle, the motor vehicle comprising:
    a windshield assembly, the windshield assembly comprising:
       a plate; and
       a shield, having a front side and an opposing rear side, wherein the plate is attached to the rear side of the shield by one or more first fastening members, whereby the shield and the plate define a windshield assembly channel between the shield and the plate, the windshield assembly channel configured to accept an attachment portion of a vehicle,
    wherein the plate is capable of being attached to the vehicle using one or more second fastening members that engage two or more of the shield, attachment portion, and plate when the attachment portion of the vehicle is disposed within the windshield assembly channel, whereby no portion of the one or more first fastening members or the one or more second fastening members extends to the front side of the shield.

11. The motor vehicle of claim 10, wherein the shield further comprises:
    a shield recess formed in the rear side of the shield and one or more of fastener recesses formed therein to accept one or more fasteners attaching the shield to the plate.

12. The motor vehicle of claim 11, wherein the one or more fasteners attaching the shield to the plate is a self-tapping fastener that engages the one or more fastener recesses.

13. The motor vehicle of claim 10, wherein the one or more second fastening members that engage two or more of the shield, attachment portion, and plate includes a screw that engages a nut embedded in the attachment portion.

14. The motor vehicle of claim 10, wherein the plate further comprises:
    one or more plate openings formed therethrough, whereby one or more fasteners pass through the one or more plate openings and secure the plate between two attachment portions of the vehicle.

15. The motor vehicle of claim 10, wherein the shield is formed from a polymeric material.

16. The windshield assembly of claim 10, wherein the shield is formed from an opaque material.

17. The motor vehicle of claim 10, wherein the motor vehicle is a motorcycle.

18. The motor vehicle of claim 14, wherein the motor vehicle is a motorcycle.

19. A method of attaching a windshield assembly to a motor vehicle, the method comprising the steps of:
    introducing a plate between a first attachment portion of a vehicle and a second attachment portion of the vehicle;
    inserting one or more first fastening members through the first attachment portion of the vehicle and into the second attachment portion of the vehicle, whereby the one or more first fastening members engage the second attachment portion of the vehicle and secure the plate between the first attachment portion of the vehicle and the second attachment portion of the vehicle; and attaching a shield having a front side and an opposing rear side to the plate via one or more second fastening members whereby no portion of the one or more first fastening members or the one or more second fastening members extends to the front side of the shield.

20. The method of claim 19, wherein the one or more first fastening members securing the plate between the first attachment portion and the second attachment portion includes a screw that engages a nut embedded in the second attachment portion.

\* \* \* \* \*